(12) United States Patent
Hutter, III

(10) Patent No.: US 7,584,582 B1
(45) Date of Patent: Sep. 8, 2009

(54) ADHESIVE BONDED ATTACHMENT ASSEMBLY FOR AN INSULATION BLANKET

(75) Inventor: Charles G. Hutter, III, Carson City, NV (US)

(73) Assignee: Physical Systems, Inc., Carson City, NV (US)

( * ) Notice: Subject to any disclaimer, the term of this patent is extended or adjusted under 35 U.S.C. 154(b) by 211 days.

(21) Appl. No.: 11/612,067

(22) Filed: Dec. 18, 2006

Related U.S. Application Data

(60) Provisional application No. 60/766,835, filed on Feb. 14, 2006.

(51) Int. Cl.
*E04B 1/74* (2006.01)
*E04B 1/38* (2006.01)
*E04B 2/00* (2006.01)
*E04B 5/00* (2006.01)
*E04B 9/00* (2006.01)
*E04C 1/40* (2006.01)

(52) U.S. Cl. .................. 52/506.02; 52/404.2; 52/407.1; 52/407.4; 52/506.05; 52/512; 156/91; 411/372.6; 411/373; 411/396; 428/99

(58) Field of Classification Search ............. 52/404.1, 52/404.2, 407.1, 407.4, 506.02, 506.05, 511, 52/512, 787.1; 156/91; 411/372.5, 372.6, 411/373, 374, 375, 376, 377, 396; 428/65.2, 428/99
See application file for complete search history.

(56) References Cited

U.S. PATENT DOCUMENTS

| | | | |
|---|---|---|---|
| 3,285,311 A | 11/1966 | Cushman | |
| 3,519,279 A * | 7/1970 | Wagner | 411/542 |
| 4,280,390 A * | 7/1981 | Murray | 411/542 |
| 4,454,660 A | 6/1984 | Glenister | |
| 4,549,741 A * | 10/1985 | Usher et al. | 277/591 |
| 4,566,242 A | 1/1986 | Dunsworth | |
| 4,668,546 A | 5/1987 | Hutter, III | |
| 4,778,702 A | 10/1988 | Hutter, III | |
| 4,822,656 A | 4/1989 | Hutter, III | |

(Continued)

OTHER PUBLICATIONS

Thermal Resistivity. (1992). Academic Press Dictionary of Science and Technology. Oxford: Elsevier Science & Technology. Dec. 17, 2008 <http://www.credoreference.com/entry/3168092/>.*

(Continued)

*Primary Examiner*—Brian E Glessner
*Assistant Examiner*—Branon C Painter
(74) *Attorney, Agent, or Firm*—Kelly Lowry & Kelley, LLP; Stuart O. Lowry

(57) ABSTRACT

An adhesive bonded attachment assembly is provided for supporting and retaining an insulation blanket on a substrate such as aircraft engine nacelle or the like. The attachment assembly includes a stud attachment having a base for adhesive bonded affixation to the nacelle substrate and a fastener element such as a threaded stud extending from the base at least partially into a grommet-lined mounting port formed in the insulation blanket. A radially enlarged, insulated cap fastener is secured to the fastener element to retain the insulation blanket on the nacelle substrate in a manner shielding surrounding structures and components from heat generated during engine operation. The insulated cap fastener projects radially beyond the associated grommet for improved heat-shielding of the adhesive bonded stud attachment, thereby safeguarding against debonding of the attachment base in response to high temperature exposure.

18 Claims, 3 Drawing Sheets

U.S. PATENT DOCUMENTS

| | | | |
|---|---|---|---|
| 4,842,912 A | | 6/1989 | Hutter, III |
| 4,919,366 A | * | 4/1990 | Cormier .................. 244/159.1 |
| 5,426,905 A | | 6/1995 | Rollhauser |
| 5,980,174 A | * | 11/1999 | Gallagher et al. ............. 411/55 |
| 6,003,718 A | | 12/1999 | Lu |
| 6,264,412 B1 | * | 7/2001 | Nakamura et al. .......... 411/352 |
| 6,299,106 B1 | | 10/2001 | Shorey |
| 2003/0180116 A1 | * | 9/2003 | Hwang et al. ............... 411/375 |
| 2005/0284995 A1 | | 12/2005 | Hutter, III |

OTHER PUBLICATIONS

General Properties of Steels. Efunda. Dec. 17, 2008. <http://www.efunda.com/materials/alloys/alloy_home/steels_properties.cfm?search_string=thermal%20conductivity12/17/2008>.*

* cited by examiner

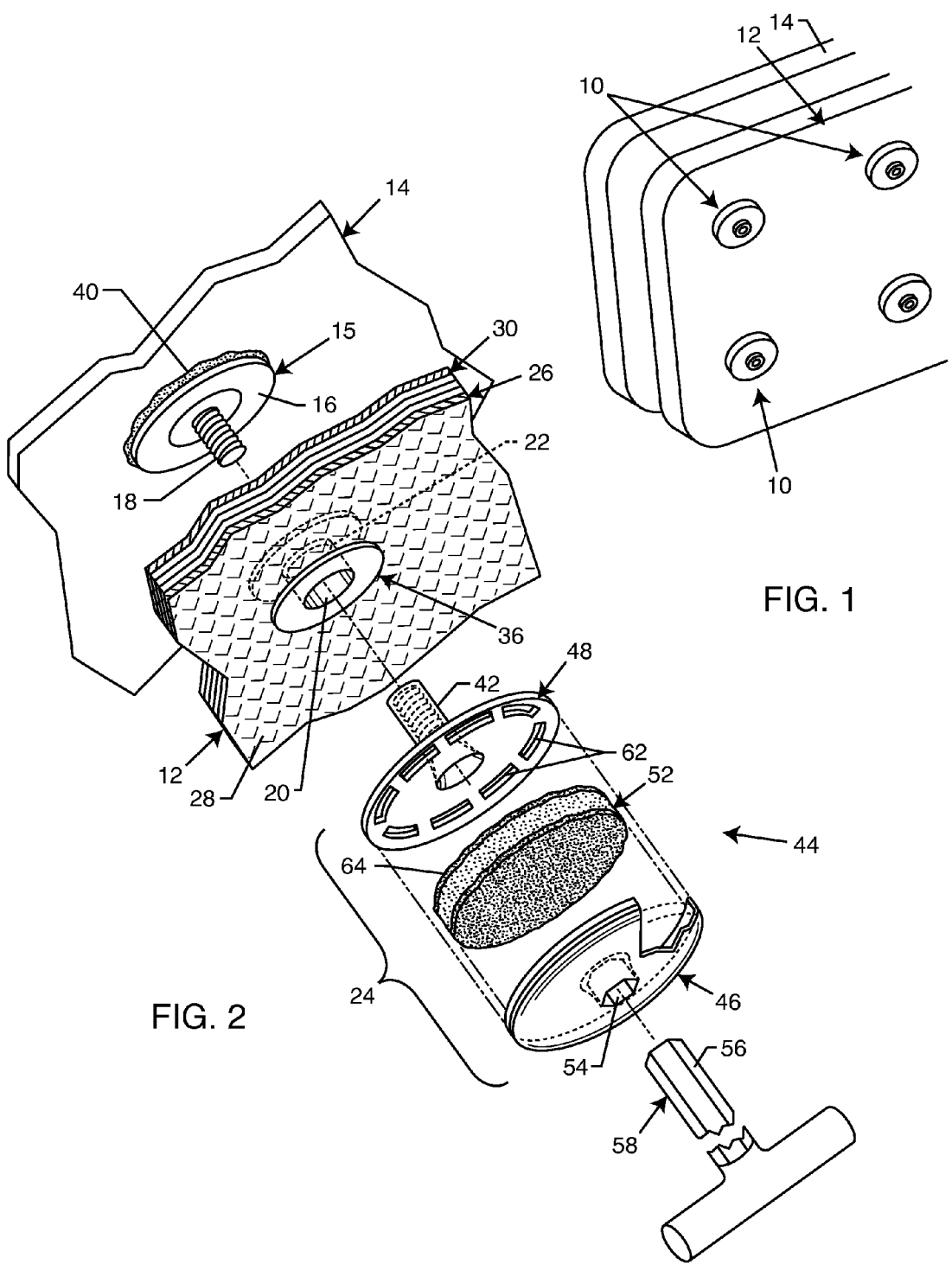

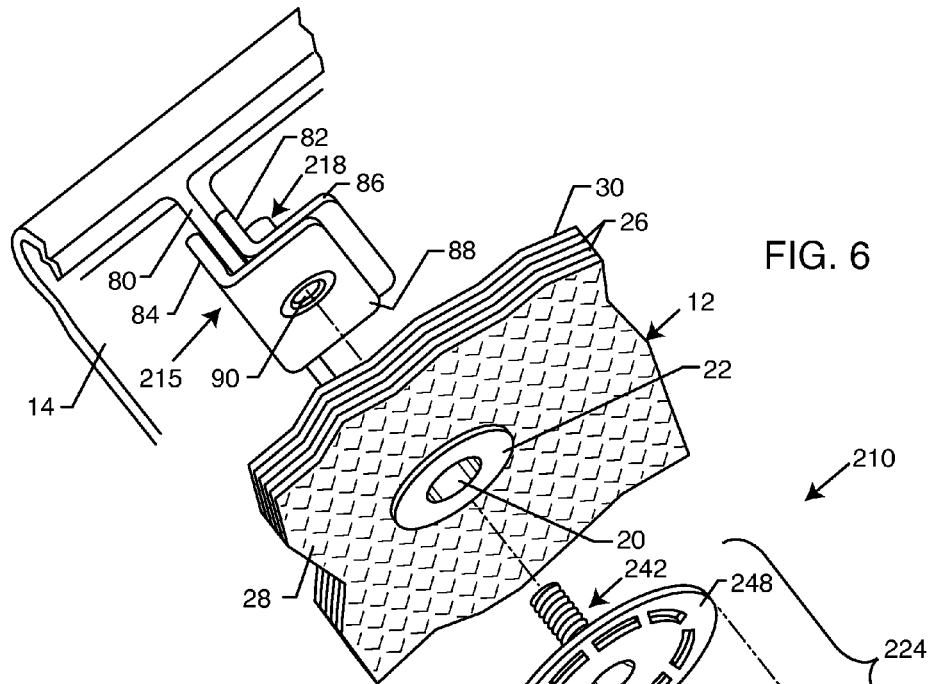
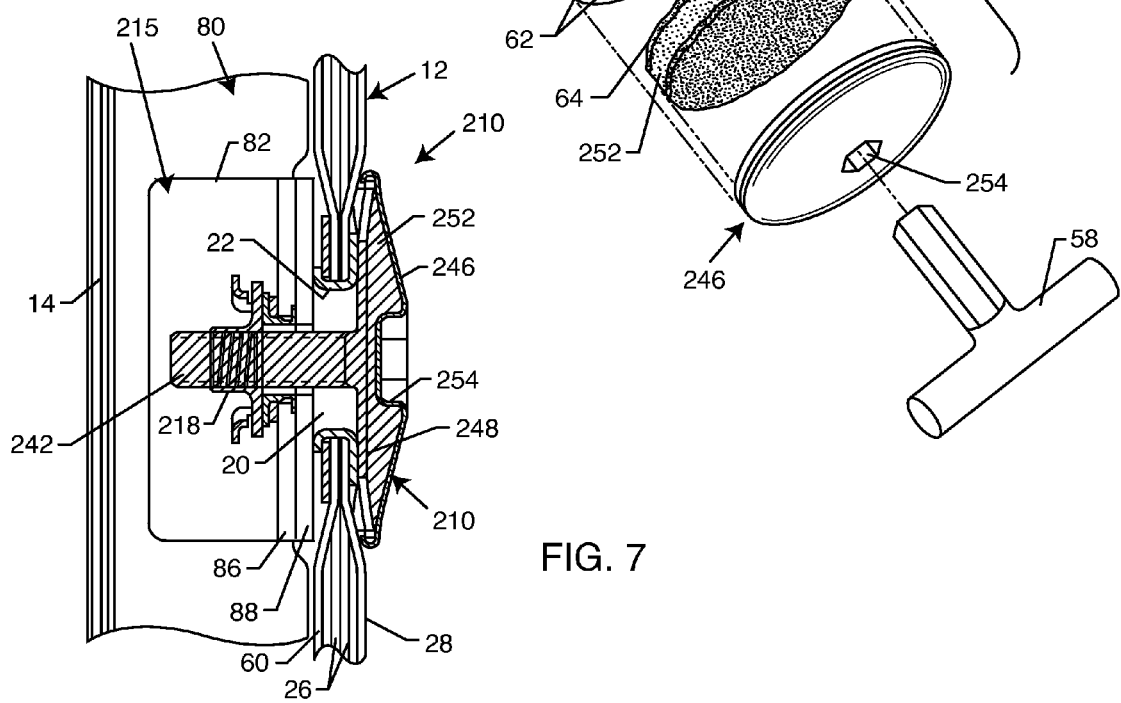

ADHESIVE BONDED ATTACHMENT ASSEMBLY FOR AN INSULATION BLANKET

BACKGROUND OF THE INVENTION

This invention relates generally to improvements in and to adhesive attachments of the type designed for bonded affixation to a selected substrate, such as an adhesive stud attachment of the general type disclosed in U.S. Pat. Nos. 4,778,702 and 4,842,912. More specifically, this invention relates to an improved attachment assembly for use in a high temperature environment, particularly such as supporting and retaining an insulation blanket or the like on a substrate such as an aircraft engine nacelle to shield surrounding structures and components from heat generated during engine operation. The improved attachment assembly includes an insulated cap fastener for safeguarding a stud attachment against debonding in response to high temperature exposure.

Adhesive bonded attachments are generally known in the art for connecting a selected component such as a threaded stud or bolt onto a selected substrate such as a panel or other frame component in an aerospace or automotive application or the like. Such adhesive attachments typically include a base defining a bonding surface adapted to receive a selected curable bonding agent, whereupon the base is then pressed against the selected substrate for the duration of bonding agent cure time. In preferred attachment designs, a temporary attachment member or fixture is provided for temporary connection to or engagement with the substrate in a manner functioning to urge or draw the base bonding surface firmly against the substrate until the bonding agent is substantially completely cured. As a result, the adhesive bonded attachment is affixed to the substrate with a substantially optimized adhesive attachment force. Exemplary adhesive bonded stud attachments having a fastener element such as a threaded stud or bolt projecting from a radially enlarged base defining the bonding surface are disclosed in U.S. Pat. Nos. 4,778,702; 4,842,912; 4,822,565; and 4,668,546, which are incorporated by reference herein.

Such adhesive bonded stud attachments have been used for supporting and retaining an insulation blanket on a substrate enclosing a relatively high temperature compartment, wherein the insulation blanket is designed to heat-shield surrounding structures and components. Specifically, such insulation blankets have been mounted at the inboard side of an aircraft engine nacelle. In a typical installation, the insulation blanket comprises a suitable refractory cloth material carrying multiple grommets defining a corresponding plurality of mounting ports formed in the blanket. A plurality of adhesive bonded stud attachments are affixed onto an inboard side of the nacelle substrate at positions for stud reception into and through the grommet-defined mounting ports in the insulation blanket. Fastener nuts or the like are then secured to the ends of the studs for retaining the insulation blanket thereon at the inboard side of the nacelle substrate.

Use of adhesive bonded stud attachments for mounting an insulation blanket onto an aircraft engine nacelle or the like has, in the past, provided effective heat-shielding of adjacent structures and components to safeguard against heat damage during normal engine operation. In this regard, adhesive bonding agents have been available to withstand temperatures associated with thermal transmission along the fastener nuts and studs, and/or metal grommets on the insulation blanket, without significant risk or thermal-induced debonding of the stud attachment from the substrate. However, more recent aircraft engines have been designed to operate at significantly higher temperatures exceeding the thermal capacity of such bonding agents, whereby the adhesive-mounted stud attachment can debond or separate from the nacelle substrate. Such failure of the stud attachment can undesirably expose the substrate and adjoining components to thermal damage.

There exists, therefore, a significant need for further improvements in and to adhesive bonded attachment assemblies particularly of the type used in a high temperature environment such as mounting an insulation blanket onto a supporting aircraft engine nacelle substrate or the like, wherein such improved attachment assembly is designed to withstand significantly higher engine operating temperatures without risk of thermal debonding from the substrate. The present invention fulfills these needs and provides further related advantages.

SUMMARY OF THE INVENTION

In accordance with the invention, an improved adhesive bonded attachment assembly is provided for use in a high temperature operating environment, such as supporting and retaining an insulation blanket on a substrate such as aircraft engine nacelle or the like. The attachment assembly includes a stud attachment having an enlarged base defining a mounting surface for adhesive bonded affixation to the substrate, in combination with a fastener element such as a threaded stud extending from the base for at least partial reception into a grommet-lined mounting port formed in the insulation blanket. An insulated cap fastener is secured to the fastener element to retain the insulation blanket on the nacelle substrate in a manner shielding surrounding structures and components from heat generated during engine operation. The insulated cap fastener is sized to physically and thermally overlie the associated grommet for improved heat-shielding of the grommet and the adhesive bonded stud attachment, thereby safeguarding against debonding of the attachment base in response to high temperature exposure.

In one preferred form, the improved adhesive attachment assembly comprises the stud attachment such as an elongated threaded stud projecting from an enlarged, generally disk-shaped base which may be constructed in accordance with U.S. Pat. Nos. 4,778,702 and 4,842,912, which are incorporated by reference herein. The attachment base is adapted for adhesive bonded affixation onto the substrate at a selected location.

The insulation blanket, which may comprise a suitable refractory cloth or the like, has a plurality of mounting ports formed therein at selected locations by means of a plurality of typically metal grommets. A plurality of the stud attachments are mounted onto the substrate at respective positions for at least partial reception of the threaded studs thereof respectively into the grommet-lined mounting ports in the insulation blanket.

Each attachment assembly further includes the insulated cap fastener such as a threaded nut for secure thread-on assembly with the associated threaded stud. Importantly, this insulated cap fastener includes a radially enlarged insulated cap having a size sufficient to project at least slightly beyond a perimeter of the associated grommet, thereby completely overlying and insulating the underlying grommet against direct heat exposure attributable, e.g., to normal engine operation. Thus, the insulated cap fasteners associated with the respective stud attachments each overlie and insulate the associated bond-on base to safeguard against debonding from the substrate.

In a preferred form, the insulated cap of each cap fastener has a hollow construction for receiving and supporting a suitable insulation material, such as a refractory cloth material. In one design, the insulated cap is defined by assembled inboard and outboard cap plates each constructed from a material selected for relatively low thermal conductivity, such as a low conductivity stainless steel, or a ceramic material, or the like. In one preferred form, the outboard cap plate may incorporate a drive surface such as a hex recess for receiving a suitable tool used to thread the cap nut onto the associated threaded stud. In an alternative design, the cap fastener may comprise a press-fit sleeve in lieu of a threaded nut for press-on or press-fit connection with an unthreaded stud of the stud attachment, in which case the drive surface on the outboard cap plate may be omitted. In either configuration, the inboard cap plate may include an annular array of apertures formed therein to reduce surface-to-surface physical and thermal contact with the underlying insulation blanket and associated grommet carried thereby.

Other features and advantages of the present invention will become apparent from the following more detailed description, taken in connection with the accompanying drawing which illustrate, by way of example, the principals of the present invention.

BRIEF DESCRIPTION OF THE DRAWINGS

The accompanying drawings illustrate the invention. In such drawings:

FIG. 1 is a fragmented perspective view showing multiple adhesive bonded attachment assemblies constructed in accordance with the invention for supporting and retaining an insulation blanket on a substrate such as an aircraft engine nacelle or the like;

FIG. 2 is an enlarged and fragmented exploded perspective view showing an exemplary adhesive bonded attachment assembly for supporting the insulation blanket relative to the substrate;

FIG. 4 is an enlarged and fragmented sectional view similar to FIG. 3, but showing the bonded attachment assembly components in assembled relation for supporting the insulation blanket on an engine nacelle or the like;

FIG. 6 is an enlarged and fragmented exploded perspective view similar to FIG. 2, but illustrating the adhesive bonded attachment assembly in accordance with a further alternative preferred form of the invention; and FIG. 7 is an enlarged and fragmented sectional view similar to FIGS. 4 and 5, but showing the adhesive bonded attachment assembly of FIG. 6.

DETAILED DESCRIPTION OF THE PREFERRED EMBODIMENTS

Figure 3:
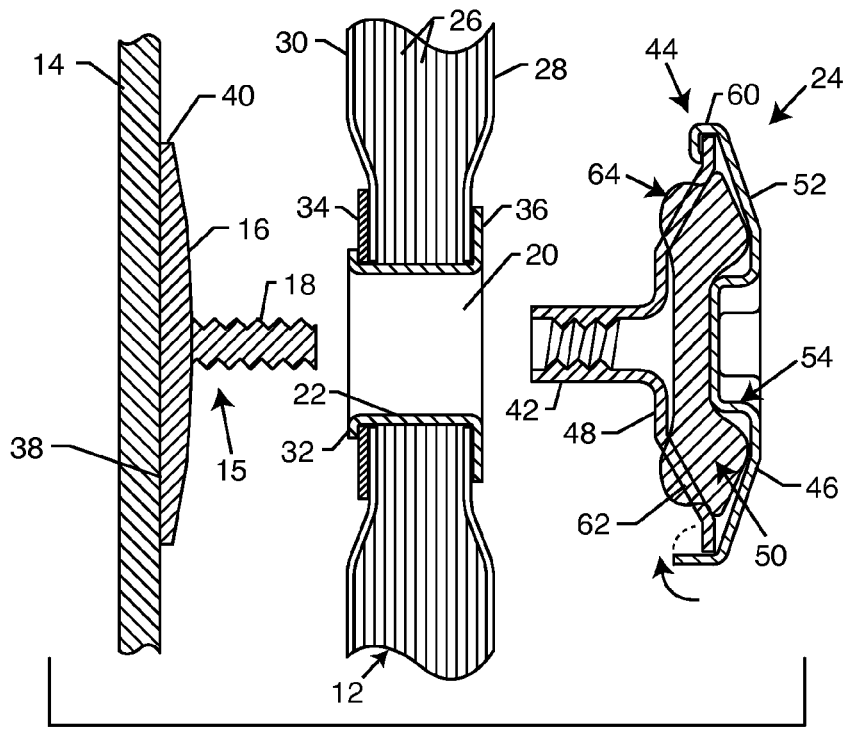
FIG. 3 is a further enlarged and exploded sectional view of the bonded attachment assembly including an insulated cap fastener for assembly with a bonded stud attachment.

As shown in the exemplary drawings, an improved adhesive bonded attachment assembly referred to generally in FIG. 1 by the reference numeral 10 is provided for use in a relatively high temperature operating environment, such as for use in supporting and retaining an insulation blanket 12 on a substrate 14 such as an aircraft engine nacelle or the like. Multiple attachment assemblies 10 are provided each including an attachment member such as a stud attachment 15 (FIGS. 2 and 3) having a base 16 designed for secure bond-on attachment to the substrate 14, and a fastener element 18 such as a stud to fit within as associated mounting port 20 formed in the insulation blanket 12 and lined by a cylindrical grommet 22. Each attachment assembly 10 further includes an insulated cap fastener 24 assembled with the associated fastener element 18 to support and retain the blanket on the substrate 14. The insulated cap fastener 24 is constructed to overlie the associated mounting port 20 and grommet 22 to heat-shield the adhesive mounted base 16 against undesired thermal debonding in response to normal and relatively high engine operating temperatures.

The substrate 14 comprises a wall or panel separating a relatively high temperature operating environment on one side from adjacent or adjoining equipment and components (not shown) on an opposite side. In this regard, in one typical embodiment, the substrate 14 is formed from a selected lightweight metal or a composite material defining a nacelle for an aircraft engine or the like. The insulation blanket 12 is mounted at an inboard or high temperature side of the nacelle substrate 14 to insulate and thereby safeguard adjacent structures and components against undesirable thermal damage during normal engine operation. In this regard, the insulation blanket 12 conventionally comprises refractory cloth material 26 provided typically in multiple internal layers (as shown best in FIGS. 2-4) with an inboard-side facing 28 formed from a material such as a stainless steel film or the like having a relatively low thermal conductivity. An opposite or outboard-side skin 30 on the insulated blanket 12 comprises a sheet of relatively low thermal conductivity material such as a durable silicone rubber.

The insulation blanket 12 includes the multiple mounting ports 20 formed therein at selected spaced-apart locations for pass-through reception of fasteners used to support and retain the blanket 12 at the inboard side of the nacelle substrate 14. These mounting ports 20 are conventionally lined by the associated or respective grommets 22 each having a generally cylindrical shape. As shown best in FIG. 3, each grommet 22 is normally defined by a short radially out-turned rim 32 at an outboard end thereof for locked engagement against the inner periphery of an annular washer 34 seated against the outboard-side blanket skin 30. In addition, each grommet 22 includes, at the inboard side thereof, a radially outwardly turned flange 36 having a size and shape for locked engagement against the inboard-side blanket facing 28. Such grommet 22 is typically constructed from a metal material, such as stainless steel or the like.

The improved adhesive bonded attachment assembly 10 of the present invention is designed for retaining and supporting the insulated blanket 12 at the inboard side of the nacelle substrate 14, in a manner preventing significant heat transmission through the blanket mounting ports 20, or along the metal grommets 22 lining such ports 20. In addition, the improved attachment assembly 10 prevents significant thermal transmission along the stud-type fastener element 18 to the adhesive bonded base 16. Accordingly, the improved attachment assembly effectively safeguards the adhesive bonded base 16 against thermal-caused debonding or separation from the substrate 14, while additionally improving the overall thermal protection provided to adjacent structures and components.

More particularly, each stud attachment 15 comprises the base 16 which may be constructed in accordance with U.S. Pat. Nos. 4,778,702 and 4,842,912, which are incorporated by reference herein. The base 16 thus provides an underside mounting surface 38 for receiving a quantity of a selected curable bonding agent 40. The base 16 is then seated against the substrate 14 at a selected location. In the preferred form, as shown and described in U.S. Pat. Nos. 4,778,702 and 4,842,912, a temporary attachment member or fixture (not shown herein) is provided for temporary connection to or engagement with the substrate 14 in a manner functioning to urge or draw the base bonding surface 38 firmly against the substrate until the bonding agent 40 is substantially completely cured. As a result, the adhesive bonded attachment is affixed to the substrate with a substantially optimized adhesive attachment force.

Figure 4:
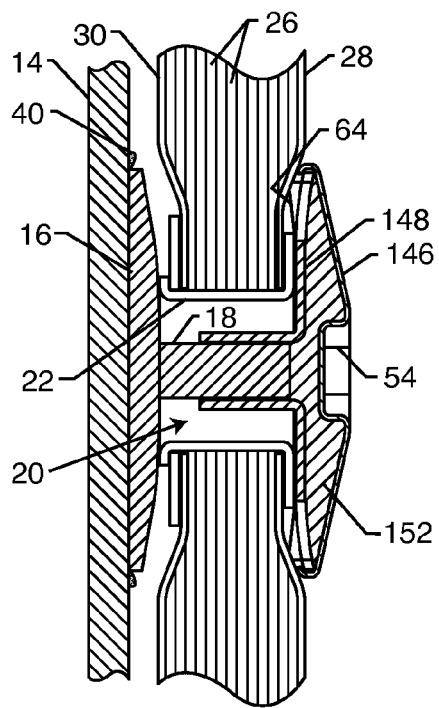

The fastener element 18 as shown in the exemplary drawings comprises an elongated stud having as externally threaded configuration (FIGS. 2-4). This fastener element or stud 18 has a length sufficient to project at least partially into an associated grommet-lined mounting port 20 formed in the insulation blanket 12.

The insulated cap fastener 24 generally comprises a fastener component such as an internally threaded sleeve or nut 42 for thread-on engagement with the stud 18, preferably with a lock thread design to preclude inadvertent loosening of the nut 42 on the stud 18, in combination with a radially enlarged insulated cap member 44 having a size and shape for physically and thermally overlying the associated grommet-lined mounting port 20. In the preferred embodiment as shown (FIGS. 2-4), this insulated cap fastener 24 comprises assembled inboard and outboard-side cap plates 46 and 48 each constructed from a material selected for relatively low thermal conductivity, such as a low conductivity stainless steel, or a ceramic material, or the like, and defining a hollow internal chamber 50 for receiving a quantity of insulation material 52 such as additional refractory cloth material or the like. The inboard-side cap plate 46 is shown to include a central drive surface 54 such as a hex-shaped drive socket recess or the like for receiving a matingly shaped drive tip 56 of a suitable drive tool 58 (FIG. 2) used for rotatably mounting the threaded nut 42 onto the associated threaded stud 18. In addition, the inboard-side cap plate 46 may include a peripheral rim or bead 60 (FIG. 3) turned over and capturing the periphery of the outboard-side cap plate 48 for retaining the two cap plates 46, 48 in assembled relation.

The diametric size of the cap member 44 is sufficient to overlie the associated mounting port 20 and the related grommet 22 including the inboard-side grommet flange 36. The cap member 44 projects radially outwardly at least a short distance beyond the periphery of the grommet flange 36 for physically contacting and pressing against the inboard-side facing 28 of the blanket 12 in the region surrounding or circumscribing the grommet flange 36. In the preferred form, the outboard-side cap plate 48 of the cap member 44 includes an annular array of apertures 62 formed therein at a position radially beyond the grommet flange 36 to reduce surface-to-surface physical and thermal contact between the outboard-side cap plate 48 and the underlying insulation blanket 12. Instead, the insulation material 52 carried within the cap chamber 50 includes an outboard-side skin 64 formed from a sheet of relatively low thermal conductivity and preferably elastomer material, such as a durable silicone rubber, for efficient gasket-type thermally sealed engagement with the underlying inboard-side facing 28 of the insulation blanket 12.

With this design, the insulation blanket 12 is supported on the substrate 14 quickly and easily by means of the multiple stud attachments 15 assembled with the corresponding insulated cap fasteners 24. Each cap fastener 24 overlies and thus heat-shields the associated mounting port 20 and grommet 22, and also overlies and heat-shields the threaded connection between the nut 42 and the stud 18. As a result, the mounting port 20 and structures associated therewith are effectively safeguarded against significant heat intrusion or soak-back.

The associated adhesive bonded base 16 is thus safeguarded against exposure to extremely high temperatures associated with modern aircraft engines, thereby protecting the base 16 against thermal-induced debonding from the nacelle substrate 14. Such protection of the bond-on base 16 additionally safeguards the substrate 14 as well as other adjacent or adjoining structures and components against thermal damage.

Figure 5:
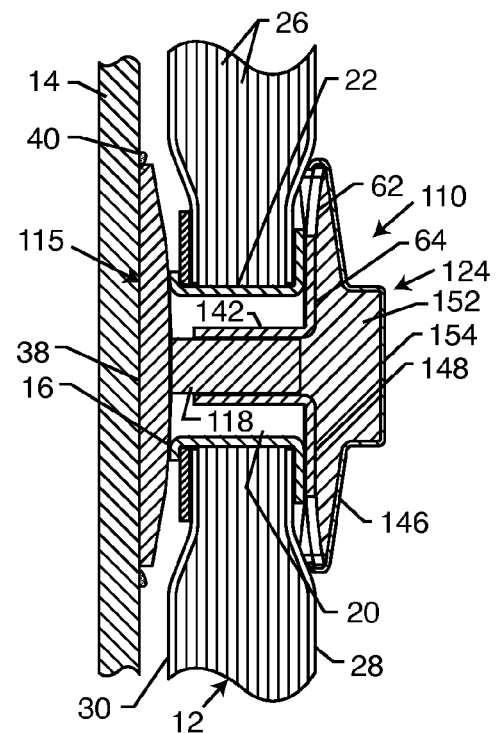
FIG. 5 is an enlarged and fragmented sectional view similar to FIG. 4, but showing the adhesive bonded attachment assembly in accordance with one alternative preferred form of the invention.

FIG. 5 illustrates the invention in accordance with one alternative preferred form, wherein modified components of the alternative adhesive bonded attachment assembly 110 are identified by common reference numerals increased in value by 100. In this embodiment, a modified stud attachment 115 includes an unthreaded stud 118 adapted for press-on or press-fit assembly with an unthreaded mounting sleeve 142 of a modified insulated cap fastener 124.

More particularly, the stud attachment 115 (FIG. 5) again includes a base 16 defining a mounting surface 38 of relatively broad surface area for bond-on attachment to the inboard side of a nacelle substrate 14 or the like as by means of a suitable bonding agent 40. The unthreaded stud 118 protrudes from the base 16 at least a short distance into a mounting port 20 formed in an insulation blanket 12, wherein this mounting port 20 is again lined by a grommet 22.

The modified insulated cap fastener 124 includes the cap member comprising inboard and outboard-side cap plates 146 and 148 defining an internal chamber for receiving and supporting a quantity of the insulation material 152. The outboard-side cap plate 148 includes the annular array of apertures 62 disposed radially outwardly beyond the periphery of the underlying grommet structure, and the insulation material 152 includes the outboard-side elastomer skin 64 for gasket-like sealed engagement with the inboard-side facing 28 of the blanket 12. In addition, the outboard-side cap plate 148 defines the hollow sleeve 142 projecting with an internally unthreaded construction sized for press-fit or snap-type fit engagement with the unthreaded stud 118. In this design, the inboard-side cap plate 146 may omit any socket-type recess but instead includes a button-shaped member 154 for facilitated manual press-on assembly with the bonded stud attachment 115.

A further alternative preferred form of the invention is shown in FIGS. 6-7, wherein modified components of the alternative adhesive bonded attachment assembly 210 are identified by common reference numerals increased in value by 200. In this embodiment, the attachment assembly 210 includes a modified cap fastener 224 having a male-type fastener or fastener component 242 such as a threaded stud for thread-in engagement with a female-type attachment member 218 such as a threaded nut (FIG. 7) carried by a nutplate unit 215 mounted onto the substrate 14. In this regard, the nutplate unit 215 may comprise an adjustable mounting bracket designed for secure bond-on affixation to a standing rib 80 or the like on the substrate 14. Such nutplate units 215 are shown and described in more detail in U.S. Publication 2005/0284995, which is incorporated by reference herein.

More particularly, the nutplate unit 215 includes nested bracket components of generally L-shaped configuration (as shown in one preferred form) defining a pair of clamp jaw plates 82 and 84 forming a base for secure bonded affixation onto the standing rib 80 at opposite sides thereof, as by means of a suitable bonding agent. The nested bracket components further define a pair of slidably overlying mounting plates 86 and 88 cooperatively forming a fastener-receiving port 90, and supporting the threaded nut 218 in general alignment with said port 90.

The modified cap fastener 224 is constructed generally as previously shown and described herein, but the associated fastener 242 comprises the male-type component such as a threaded stud for reception through one of the grommet-lined mounting ports 20 in the insulation blanket 12, and for further thread-in coupling with the threaded nut 218 carried by the nutplate unit 215. This cap fastener 224 again includes inboard and outboard-side cap plates 246 and 248 defining an internal chamber for receiving and supporting a disk-shaped quantity of the insulation material 252. The outboard-side cap plate 248 includes the annular array of apertures 62 disposed radially outwardly beyond the periphery of the underlying grommet structure, and the insulation material 252 includes the outboard-side elastomer skin 64 for gasket-like sealed engagement with the inboard-side facing 28 of the blanket 12. In addition, the outboard-side cap plate 248 defines the threaded stud fastener 242. In this design, the inboard-side cap plate 246 includes the socket-type recess 254 for engaging with a suitable tool 58 (FIG. 6) for rotatably assembling the cap fastener 210 with the nutplate unit 215.

Although various embodiments and alternatives have been described in detail for purposes of illustration, various further modifications may be made without departing from the scope and spirit of the invention. Accordingly, no limitation on the invention is intended by way of the foregoing description and accompanying drawings, except as set forth in the appended claims.

What is claimed is:

1. An adhesive bonded attachment assembly for supporting an insulation blanket on one side of a substrate, said attachment assembly comprising:
   an attachment member including an enlarged base defining a mounting surface having an extended surface area for adhesive bonded attachment to the one side of the substrate, and a fastener element; and
   a cap fastener including a radially enlarged and thermally insulated cap member, and a fastener component for assembly with said fastener element of said attachment member;
   at least one of said fastener element and said fastener component having a size and shape to extend at least partially into a mounting port formed in the insulation blanket, and said radially enlarged cap member having a size and shape to overlie said fastener element and further to overlie and engage the insulation blanket in a region surrounding said mounting port;
   said insulated cap member comprising an inboard-side cap plate and an outboard-side cap plate cooperatively defining an internal cap chamber having an insulation material carried therein.

2. The adhesive bonded attachment assembly of claim 1 wherein said fastener element comprises a threaded stud, and further wherein said fastener component comprises a threaded nut.

3. The adhesive bonded attachment assembly of claim 1 wherein said fastener element comprises an unthreaded stud, and further wherein said fastener component comprises an unthreaded sleeve for press-fit connection with said stud.

4. The adhesive bonded attachment assembly of claim 1 wherein said fastener element comprises a female fastener element, and further wherein said fastener component comprises a male fastener component.

5. The adhesive bonded attachment assembly of claim 1 wherein said insulation material comprises a refractory cloth material.

6. The adhesive bonded attachment assembly of claim 1 wherein said outboard-side cap plate has an annular array of apertures formed therein.

7. The adhesive bonded attachment assembly of claim 6 wherein said insulation material carried within said cap chamber further comprises a seal gasket exposed through said apertures for contacting the insulation blanket in a region surrounding said mounting port.

8. The adhesive bonded attachment assembly of claim 1 wherein said insulated cap member is formed from a heat insulative material.

9. The adhesive bonded attachment assembly of claim 1 wherein said insulated cap member further defines a drive surface formed thereon.

10. An adhesive bonded attachment assembly in combination with an insulation blanket having a mounting port formed therein and a substrate having a relatively high temperature environment at one side thereof, said attachment assembly supporting said insulation blanket on said one side of a said substrate at a position between said substrate and the high temperature environment, said attachment assembly comprising:
    an attachment member including an enlarged base defining a mounting surface having an extended surface area for adhesive bonded attachment to said one side of the substrate, and a fastener element carried by said base;
    a bonding agent adhesively bonding said mounting surface of said enlarged base onto said one side of said substrate; and
    a cap fastener including a radially enlarged and thermally insulated cap member, and a fastener component carried by said cap member for assembly with said fastener element of said attachment member;
    at least one of said fastener element and said fastener component having a size and shape to extend at least partially into said mounting port formed in said insulation blanket, and said radially enlarged cap member having a size and shape to overlie said fastener element and further to overlie and engage said insulation blanket in a region surrounding said mounting port;
    said insulated cap member comprising an inboard-side cap plate and an outboard-side cap plate cooperatively defining an internal cap chamber having an insulation material carried therein.

11. The adhesive bonded attachment assembly of claim 10 wherein said fastener element comprises a male fastener element, and further wherein said fastener component comprises a female fastener component.

12. The adhesive bonded attachment assembly of claim 10 wherein said fastener element comprises a female fastener element, and further wherein said fastener component comprises a male fastener component.

13. The adhesive bonded attachment assembly of claim 10 wherein said insulation material comprises a refractory cloth material.

14. The adhesive bonded attachment assembly of claim 10 wherein said outboard-side cap plate has an annular array of apertures formed therein, and further wherein said insulation material carried within said cap chamber includes a seal gasket exposed through said apertures for contacting said insulation blanket in a region surrounding said mounting port.

15. The adhesive bonded attachment assembly of claim 14 further comprising a grommet lining said mounting port, said seal gasket contacting said insulation blanket in a region surrounding said grommet.

16. The adhesive bonded attachment assembly of claim 10 wherein said insulated cap member is formed from a heat insulative material.

17. The adhesive bonded attachment assembly of claim 10 wherein said cap member further defines a drive surface formed thereon.

18. The adhesive bonded attachment assembly of claim 1 further comprising a bonding agent adhesively bonding said mounting surface of said enlarged base onto said one side of said substrate.

* * * * *